US008957343B2

(12) United States Patent

Ishiguro et al.

(10) Patent No.: US 8,957,343 B2
(45) Date of Patent: Feb. 17, 2015

(54) ELECTRODE SUPPORT STRUCTURE AND ELECTRIC HEATING DEVICE HAVING SAME

(75) Inventors: Katsunori Ishiguro, Toyota (JP); Masaki Furuhashi, Toyota (JP)

(73) Assignee: Aisin Takaoka Co., Ltd., Toyota-Shi (JP)

( * ) Notice: Subject to any disclaimer, the term of this patent is extended or adjusted under 35 U.S.C. 154(b) by 489 days.

(21) Appl. No.: 12/808,138

(22) PCT Filed: Sep. 26, 2008

(86) PCT No.: PCT/JP2008/067474
§ 371 (c)(1), (2), (4) Date: Jun. 14, 2010

(87) PCT Pub. No.: WO2009/075133
PCT Pub. Date: Jun. 18, 2009

(65) Prior Publication Data

US 2010/0264129 A1 Oct. 21, 2010

(30) Foreign Application Priority Data

Dec. 13, 2007 (JP) ................................ 2007-322506

(51) Int. Cl.
*B23K 31/02* (2006.01)
*B23K 9/067* (2006.01)
(Continued)

(52) U.S. Cl.
CPC .. *C21D 1/40* (2013.01); *C21D 1/34* (2013.01); *C21D 7/13* (2013.01); *H05B 3/023* (2013.01); *B21D 37/16* (2013.01); *C21D 9/562* (2013.01); *C21D 9/62* (2013.01); *C21D 1/673* (2013.01)
USPC ............ 219/61.4; 219/50; 219/67; 219/86.8; 219/88; 219/119; 219/158; 219/443.1; 219/546

(58) Field of Classification Search
CPC ................................ B05B 3/023; B21D 37/16
USPC ............... 219/61, 67, 86.25, 86.24, 119, 158, 219/161, 50, 61.4, 86.8, 77, 443.1, 546; 425/407, 174.6, 547, 548, 384
See application file for complete search history.

(56) References Cited

U.S. PATENT DOCUMENTS

| | | | | |
|---|---|---|---|---|
| 454,698 | A | 6/1891 | Angell | |
| 2,979,599 | A * | 4/1961 | Width | 219/87 |

(Continued)

FOREIGN PATENT DOCUMENTS

| | | | | |
|---|---|---|---|---|
| GB | 876920 | 9/1961 | | |
| JP | 57-053594 | * 3/1982 | | H05B 3/00 |

(Continued)

OTHER PUBLICATIONS

English translation of JP57-053594 to Ichiro Hamasaki et al.*

(Continued)

*Primary Examiner* — Jesse Y Miyoshi
(74) *Attorney, Agent, or Firm* — Buchanan Ingersoll & Rooney PC

(57) ABSTRACT

Provided is an electrode support structure in which local heating can be prevented from occurring in a workpiece during the electric heating. The electrode support structure is usable for applying a load to the electrodes used for the electric heating of a metal plate, and comprises at least two members, i.e., a first member to which the electrodes are fixed and a second member which receives the load from the first member or connects the first member to a load means. The support structure in which the two members are joined to each other through an elastic member can uniformly apply the load to the electrodes for electric heating so that the electrodes can uniformly contact with the workpiece, whereby the workpiece can be uniformly heated.

10 Claims, 6 Drawing Sheets

(51) Int. Cl.

| | |
|---|---|
| ***C21D 1/40*** | (2006.01) |
| ***C21D 1/34*** | (2006.01) |
| ***C21D 7/13*** | (2006.01) |
| ***H05B 3/02*** | (2006.01) |
| ***B21D 37/16*** | (2006.01) |
| *C21D 9/56* | (2006.01) |
| *C21D 9/62* | (2006.01) |
| *C21D 1/673* | (2006.01) |

(56) References Cited

U.S. PATENT DOCUMENTS

| | | | |
|---|---|---|---|
| 5,744,773 | A | 4/1998 | Van Otteren et al. |
| 6,037,558 | A | 3/2000 | Geiermann et al. |

FOREIGN PATENT DOCUMENTS

| | | | |
|---|---|---|---|
| JP | 57-53594 | | 3/1982 |
| JP | 1-279589 | A | 11/1989 |
| JP | 4-014785 | A | 1/1992 |
| JP | 4-087346 | A | 3/1992 |
| JP | 5-280184 | A | 10/1993 |
| JP | 8-064343 | A | 3/1996 |
| JP | 11-020113 | A | 1/1999 |
| JP | 2002-018531 | A | 1/2002 |
| JP | 2005-230823 | A1 | 9/2005 |
| JP | 2006-252972 | A | 9/2006 |
| JP | 2007-142431 | A | 6/2007 |
| SU | 1715863 | A1 | 2/1992 |
| WO | WO 2005/077588 | A1 | 8/2005 |

OTHER PUBLICATIONS

English Translation of the International Preliminary Report on Patentability (IPRP) (Forms PCT/IB/338 and PCT/IB/373) and Written Opinion of the International Searching Authority and International Preliminary Report on Patentability (Form PCT/ISA/237) issued in corresponding International PCT Application No. PCT/JP2008/067474 dated Aug. 12, 2010.

International Search Report issued by the Japanese Patent Office on Dec. 16, 2008 as the International Searching Authority in International Application No. PCT/JP2008/067474.

Written Opinion issued by the Japanese Patent Office on Dec. 16, 2008 as the International Searching Authority in International Application No. PCT/JP2008/067474.

International Preliminary Report of Patentability issued by the Japanese Patent Office on Jan. 4, 2010 as the International Searching Authority in International Application No. PCT/JP2008/067474.

European Search Report dated Jun. 26, 2013 issued in the corresponding European Patent Application No. 08660682.7-1362/2230880.

* cited by examiner

ELECTRODE SUPPORT STRUCTURE AND ELECTRIC HEATING DEVICE HAVING SAME

TECHNICAL FIELD

Reference to Related Application

The present invention is based upon and claims the benefit of the priority of Japanese patent application No. 2007-322506 filed on Dec. 13, 2007, the disclosure of which is incorporated herein in its entirety by reference thereto.

The present invention relates to an electrode support structure for an electric heating device for a workpiece, especially plate-shaped workpiece, and particularly relates to an electrode support structure to apply a uniform load to an electrode for electric heating and an electric heating device having the same.

BACKGROUND

A hot press method or a die quenching method is one of manufacturing methods for parts such as a part for a vehicle that requires high strength. The manufacturing method is composed of heating a steel workpiece up to 900 degree C., for example, and press-forming or quenching at the same time of the press-forming to harden the workpiece.

A heating device such as a furnace is usually used for heating a workpiece. However, it takes approximately three to five minutes to heat a workpiece up to 900 degree C. in a furnace and the heating time is rather longer than the time for a press-forming step. In addition, because it takes some more time to take out the workpiece from the furnace and transfer it to the press-forming step, it causes temperature drop, unevenness of temperature and generating scales.

Thus an electric heating (conduction heating) is used to solve the problem. This is a method to heat using the Joule heat generated by a large electric current across electrodes attached on both ends of a workpiece. In this case, semi-spherical electrodes or flat bar electrodes, which contact with the workpiece flatly, are used. Patent Document 1, for example, discloses one or more semi-spherical electrodes contacting with each end portion of a metal plate.

The electrodes are connected with both end portions of a workpiece and when the electrodes are flat bar electrodes, the electrodes should be sufficiently contacted with the workpiece. For this purpose, one end of the workpiece is sandwiched from both sides (upper surface and opposite surface) by a pair of electrodes confronting each other (each of which is called as upper electrode and lower electrode, respectively) and is clamp-held, and both ends are similarly clamped and contacted enough, and then electric current is fed across the electrodes on both ends.

Patent Document 1: JP Patent Kokai Publication No. JP-P2002-18531A

SUMMARY

The entire disclosure of Patent Document 1 is incorporated herein by reference thereto. The following analyses are made based on the present invention.

The flat bar electrode is especially used when a whole workpiece is to be electrically heated uniformly. Because when semi-spherical electrodes are used, even when a plurality of electrodes are used, uneven temperature distribution from a center portion to an end portion may occur since electric current does not flow in the end portion where semi-spherical electrodes are not arranged.

When flat bar electrodes having the same lengths as a width of a workpiece are used, uneven temperature distribution should not occur because the electric current will flow in the workpiece evenly. However, such a situation requires a condition that the whole flat bar electrode should make uniform contact with the surface of the workpiece. To achieve such a situation, the flat bar electrodes are in contact with the workpiece from both sides (from upside and downside) with a load. However, it occurs uneven current and uneven heating because the flat bar electrodes are structured from rigid materials and it is difficult to contact the flat bar electrodes with the workpiece uniformly. Then the temperature distribution in the determined area to be heated becomes uneven.

It is an object of the present invention to provide an electrode support structure for electric heating to prevent uneven heating of a workpiece and an electric heating device having the same.

According to a first aspect of the present invention, there is provided an electrode support structure to load an electrode for electric heating of a workpiece, in which the electrode support structure has at least two members, i.e., a first member to hold the electrode and a second member to receive a load from the first member or to connect the first member with a load means, and these two members are connected through an elastic member.

Preferably, the two members are arranged in series along a direction of the load applied to the electrode.

Preferably, surfaces of the two members confronting each other have mutually complementary shapes and the elastic member is provided between the two confronting surfaces.

Preferably, the two confronting surfaces have a step-difference structure of mutually stepped complementary profiles.

Preferably, the elastic member is an insulator.

Preferably, the elastic member is made of rubber and/or insulation resin.

Preferably, the electrode is configured of an upper electrode and a lower electrode each having a contact surface of which a shape is plane, band-shaped or linear and the upper and lower electrodes sandwich a plate-shaped workpiece by contacting with the plate-shaped workpiece, and at least one contact surface of the electrodes is band-shaped or linear.

Preferably, the band-shaped or linear contact surface is formed by a part of a rod-shaped electrode of which a section is circular or oval.

According to a second aspect of the present invention, it is provided an electric heating device which has an electrode support structure explained above.

According to the present invention, electrodes for electric heating can be contacted with a workpiece evenly without applying unnecessary high load and a uniform heating can be achieved. In other words, a uniform load is applied on the contact surface of the electrode with the workpiece.

Figure 3:
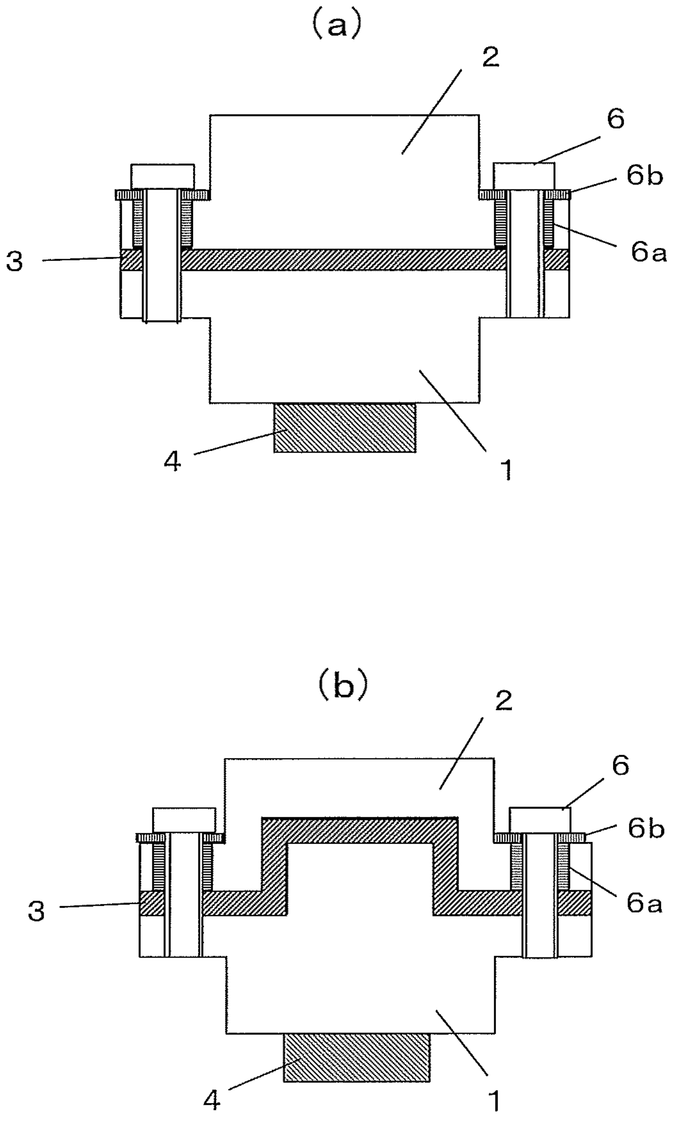

(a) of FIG. 3 illustrates a profile of connecting surface between a first member and a second member of an electrode support structure according to a reference example. (b) of FIG. 3 illustrates a profile of connecting surface between a first member and a second member of an electrode support structure according to an example of the present invention.

Figure 4:
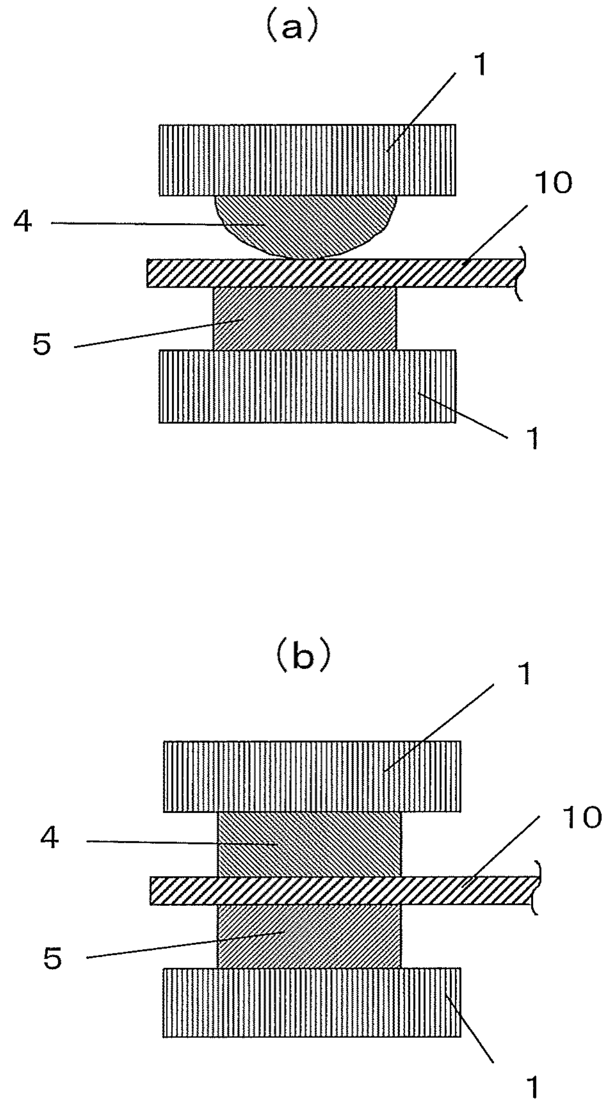

(a) of FIG. 4 illustrates a combination of sections of an upper electrode and a lower electrode used for an electrode support structure according to an example of the present invention. (b) of FIG. 4 is another example.

Figure 5:
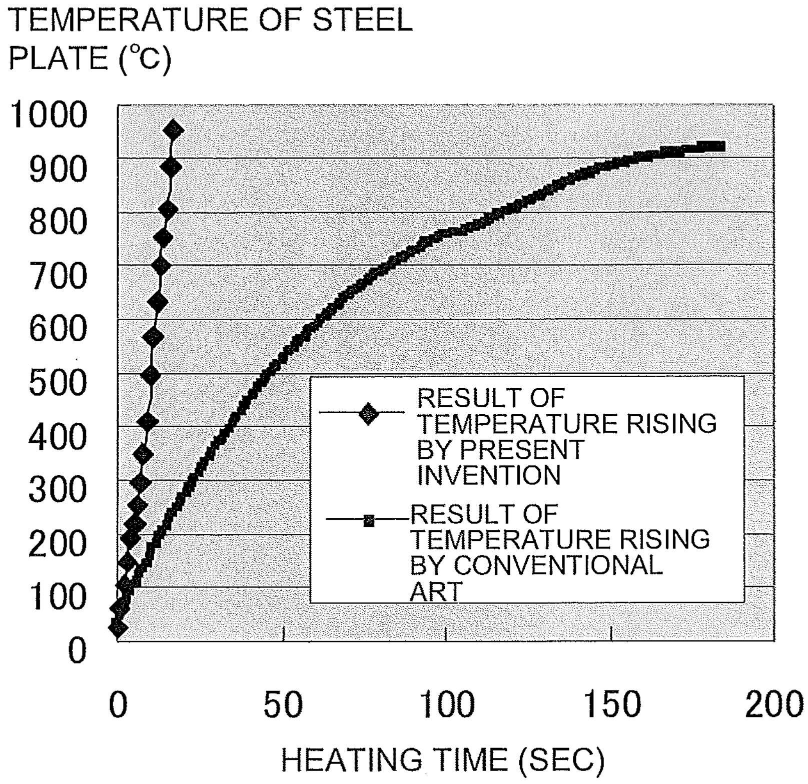

FIG. 5 shows a graph illustrating temperature rising curves of workpieces by an electric heating with an electrode support structure according to an example of the present invention and by a conventional furnace.

Figure 6:
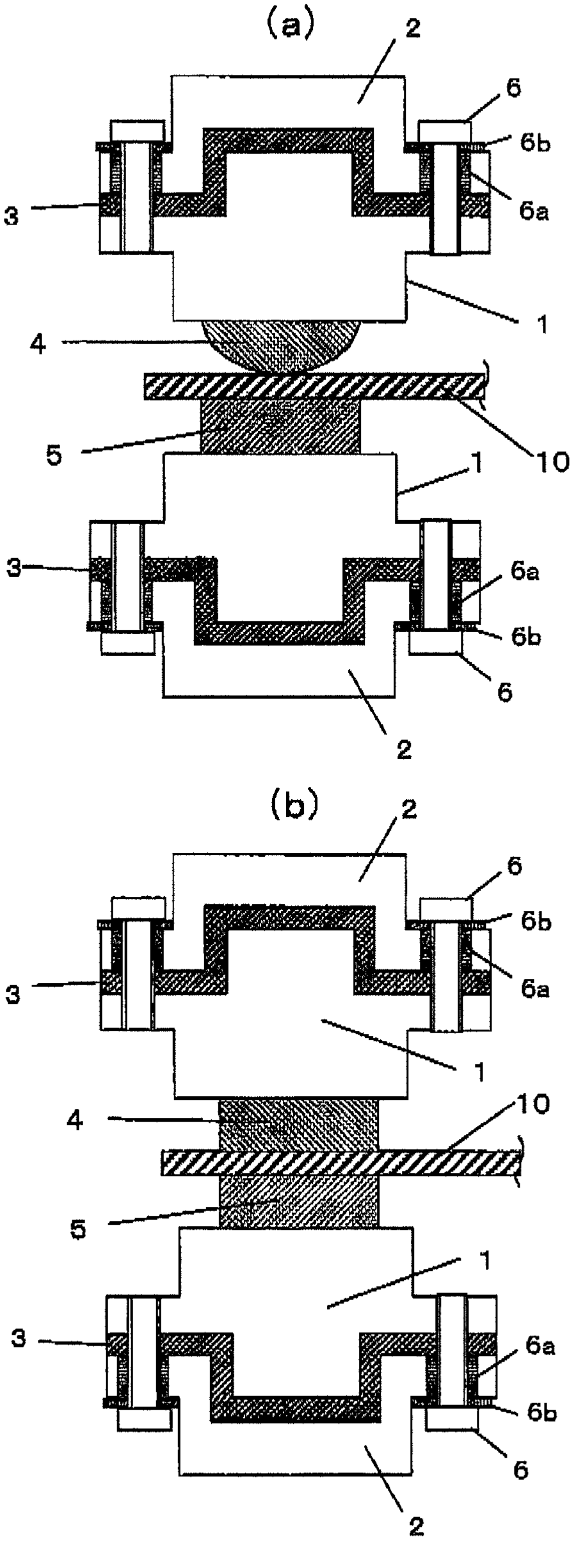

(a) of FIG. 6 illustrates a combination of sections of an upper electrode and a lower electrode used for an electrode support structure according to an example of the present invention. (b) of FIG. 6 is another example.

PREFERRED MODES

A load applied to electrodes (upper electrode and lower electrode) used for electric heating to contact with a workpiece uniformly is usually applied downwardly (vertically). Therefore, a first member of an electrode support structure holding an upper electrode is connected with a second member of the electrode support structure, which is arranged in the upper direction of the first member, through an elastic member. The second member is connected with a load machine at the top portion finally, and has a role to transfer the load through the elastic member to the first member, that is, to the upper electrode.

Any materials that can be electrically heated are available for a workpiece to be heated, and particularly a plate-shaped workpiece is available. Steel materials such as an iron material and a steel plate (steel sheet) are typically available and non-iron metals, alloys and composite materials are also available.

On the other hand, a first member of an electrode support structure holding a lower electrode is connected with a second member of the electrode support structure, which is arranged in the lower direction of the first member, through an elastic member. The second member is connected with a base of a heating device finally, and has a role to receive the load applied to the lower electrode together with the base through the first member and the elastic member.

The first member structured in such a way is connected with the second member flexibly through the elastic member and compensates unevenness of contact between the electrode held on the first member and the workpiece, and then the load can be transferred to the electrode and workpiece and a uniform contact between them can be achieved. Materials for the first and second members are not limitative as far as they have enough strength as a structural material. Shapes of transverse sections are not limited, either.

The electrode support structure having an elastic member can be used for only an upper electrode or a lower electrode; however, it is more effective to apply for both the electrodes. A flat bar (rod-shaped) electrode is frequently used for an electric heating and in such a case it is preferable to make at least one of the contact surfaces of the upper and lower electrodes with the workpiece to be band-shaped or linear rather than plane to obtain maximum effect of an electrode support structure according to the present invention. The uniform contact between the electrode and the workpiece can be made definite by this method. The band-shaped or linear contact surface can be and preferably structured as a part of a circumferential surface of a rod-shaped body (cylindrical or cylindroid body, for example) having a curved circumferential surface.

The same structure can be applied in accordance with a direction of a load even when a direction of the load is changed to be applied upwardly from downwardly or horizontally.

Materials that induce elastic deformation can be used for the elastic member and solid materials such as rubber, spring, polymer materials, etc. or fluid-type materials are conceivable. Among them, rubber may be most simple and convenient. The elastic member preferably possesses an insulation characteristic also. In addition, the elastic member is not necessarily made of a single material but can be laminated materials, in which high insulation sheet materials are stacked or intervened, or can be realized by combining multiple elastic materials (or insulation materials, in some cases).

EXAMPLES

Example 1

Figure 1:
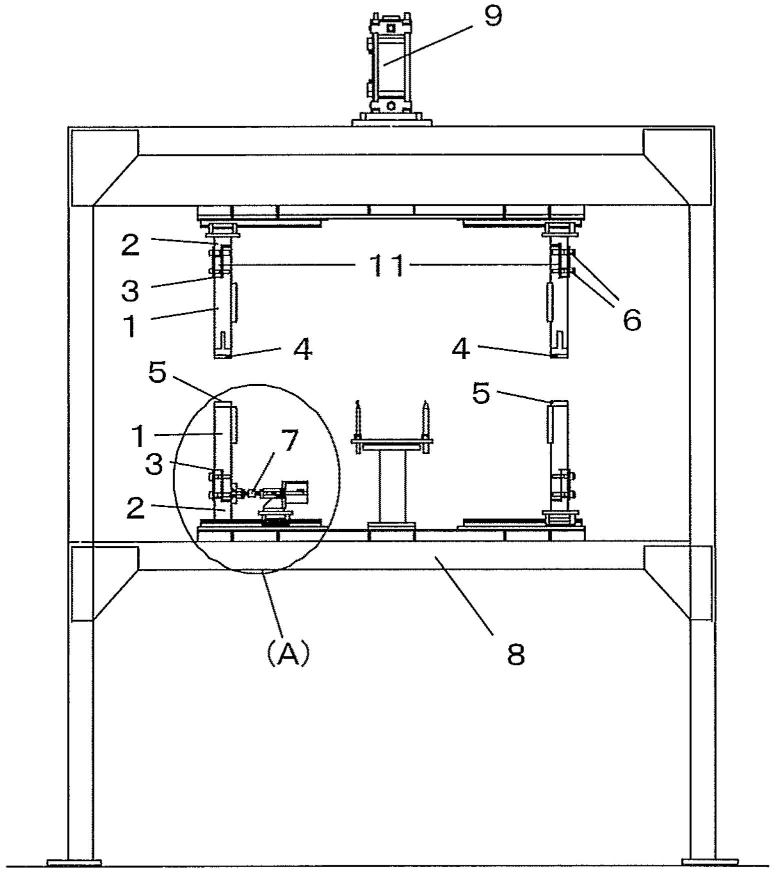
FIG. 1 illustrates an elevation view of an electric heating device having an electrode support structure according to an example of the present invention.

FIG. 1 illustrates an elevation view of an electric heating device having an electrode support structure according to an example of the present invention. The electric heating device comprises a base 8, a load machine 9, upper electrodes 4 and lower electrodes 5 and four electrode support structures supporting the electrodes. There are two electrode support structures on upper side and lower side in each right and left sides, respectively, and therefore four electrode support structures are provided in all inside the base 8. A flat bar (rod shaped) electrode (upper electrode 4 or lower electrode 5) is fixed on each of the first member 1. Both ends of a workpiece (metal plate, not shown) are sandwiched by the upper electrodes 4 and the lower electrodes 5 and an electric current is applied between the contacted two sets of the upper electrode 4 and the lower electrode 5 on right and left sides, respectively, on the both ends of the workpiece (metal plate, not shown). All of the four electrodes are supported by the electrode support structures according to an example of the present invention in Example 1. Connecting portions of the first member 1 and the second member 2 are illustrated in longitudinal sections.

The load machine (load means) 9 to apply a load from the top side is arranged at the top portion of the heating device in FIG. 1 and the load is applied to the upper electrodes 4 on right and left sides through the upper second members 2, upper elastic members (rubbers) 3 and upper first members 1. The lower electrodes 5 are fixed on the lower first members 1 and the first members 1 are connected to the lower second members 2 through the lower elastic members (rubbers) 3 and to the base 8 finally to support the load applied to the lower electrodes 5 from the upper electrodes 4 through the metal plate (not shown). The same symbols are partially omitted in the drawing because the heating device is almost symmetrical.

The elastic member 3 arranged between the first member 1 and the second member 2 has an effect to connect the first member 1 and the second member 2 flexibly, to transfer the load from the electrode 4 to the electrode 5 uniformly and to contact the electrode 4 and the electrode 5 with the metal plate (not shown) uniformly. According to Example 1, the first member 1 and the second member 2 are made of steel and have rectangular transverse sections; however, they are not limitative but can be circular or H-shaped steel, and the like.

Figure 2:
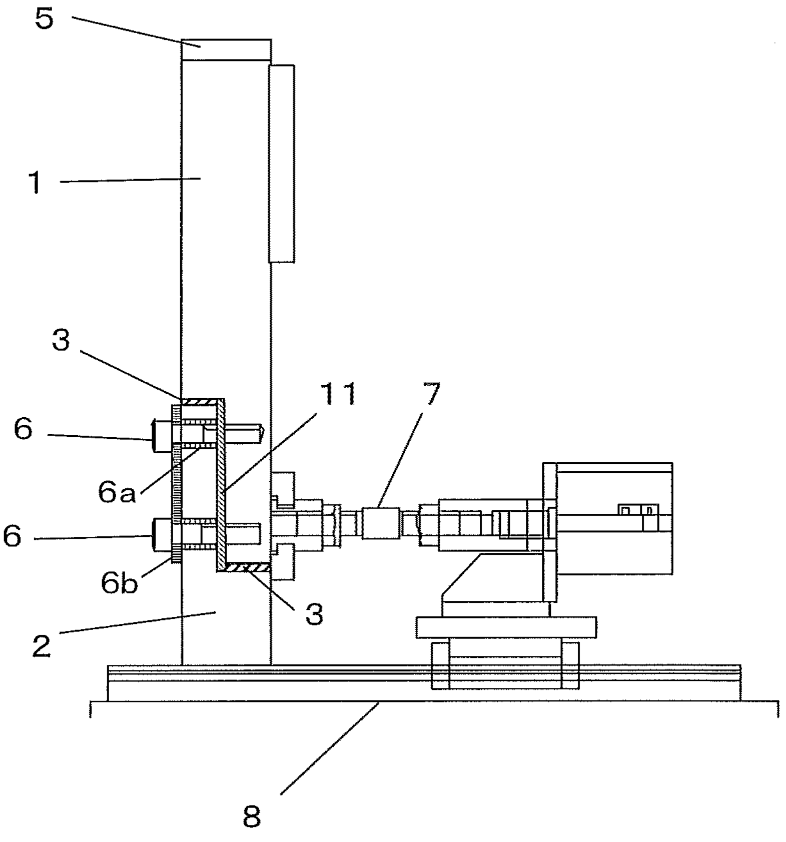
FIG. 2 is an enlarged drawing of portion (A) in FIG. 1.

FIG. 2 is an enlarged drawing of portion (A) in FIG. 1. The connecting portion of the first member and the second member is illustrated in section. The first member 1 and the second member 2 are connected by bolts 6 with an insulation washer 6*b* and insulation sleeves 6*a* for insulation. According to Example 1, a tension bar 7 is provided for applying a force to the metal plate by pulling the electrodes towards both sides when the electrodes 4 and 5 sandwich the metal plate (not shown) and apply an electric current. Therefore, the connecting portion between the first member 1 and the second member 2 has a cranked shape to respond to the force in horizontal direction and to make it easy to connect by the bolts. Surfaces of the first member 1 and the second member 2 confronting each other have mutually complementary shapes, that is, the profiles of the surfaces fit each other, and the elastic members 3 and an insulation resin 11 are sandwiched between the surfaces.

The elastic members (rubbers) 3 are arranged at positions to receive the load in a vertical direction (two places, laid on its side in FIG. 2) and the insulation resin 11 is arranged at a position to receive a load in a horizontal direction (one place, arranged vertically in FIG. 2), and the first member 1 and the second member 2 are insulated and connected by the bolts 6. However, a connecting method is not limited to a bolt. An elastic member is not necessarily provided on a surface to receive the load in a horizontal direction because the horizontal load does not directly apply a vertical load to the electrodes. The elastic members (rubbers) 3 and the insulation resin 11 also serve as insulators between the first member 1 and the second member 2.

Flat bar electrodes are used for the electrodes 4 and 5 to achieve uniform electrical heating. The contact surface of the flat bar electrode is basically plane. It is possible to use the electrode having a plane contact surface for both of the upper and lower electrodes on the electrode support structures according to the present invention; however, it is preferable to make at least one of the contact surfaces of the upper and lower electrodes with the workpiece to be band-shaped or linear to obtain maximum effect of the electrode support structure according to the present invention. A material having a high thermal conductivity such as cupper or tungsten, etc. can be used for the electrode and the electrode may be cooled by water.

FIG. 4 illustrates sectional views when a metal plate 10 is sandwiched by the upper electrode 4 and the lower electrode 5. (a) of FIG. 4 is a section view of a combination of electrodes according to Example 1, in which a flat bar electrode whose section is semi-circular or semi-oval is used for the upper electrode 4 and a flat bar electrode whose section is rectangular is used for the lower electrode 5. The contact surface of the electrode to the metal plate becomes band-shaped or linear when a flat bar electrode whose section is semi-circular or semi-oval. It is possible to use flat bar electrodes whose sections are rectangular for the upper and lower electrodes 4 and 5 as shown in (b) of FIG. 4. Electrodes whose sections are semi-circular or semi-oval can be used for upper and lower electrodes, although it is not shown in the drawing.

FIG. 5 shows a graph comparing a temperature rising curve of a steel plate of size 800×125 mm and thickness 1.6 mm heated by an electric heating using the flat bar electrodes (approximately 125 mm long and 20 mm wide each) as shown in (a) of FIG. 4 and a temperature rising curve of a similar steel plate heated using a conventional furnace. Although it took approximately 160 seconds to heat the steel plate up to 900 degree C. from the room temperature when using the conventional furnace, it took only about 15 seconds to heat up to 900 degree C. from the room temperature when the steel plate was electrically heated using the electrode support structures according to the present invention and the whole steel plate was heated uniformly.

Example 2

The connecting portion between the first member 1 and the second member 2 is crank-shaped in Example 1; however, it is not necessary to be cranked and slanting surface may be included. FIG. 3 illustrates examples of profiles of connecting surface between the first member 1 and the second member 2 of an electrode support structure according to an example of the present invention. A simple plane flange connecting as shown in (a) of FIG. 3 may be possible and a complementary combination of a concaved member and a convex member as shown in (b) of FIG. 3 may be also possible. In each case, an elastic member 3 is provided between the first member 1 and the second member 2 and both members are insulated and connected by bolts 6 with insulation washers 6*b* and insulation sleeves 6*a*.

In addition, a combination of two electrodes for electric heating to heat a plate-shaped workpiece electrically by clamping the workpiece from both surfaces at both ends of the workpiece, in which a contact surface of the electrode at one side is plane and a contact surface of the electrode at the opposite side is band-shaped or linear that is formed by a part of a cylindrical or cylindroidal circumference, has an effect for solving the problem to be solved by the present invention.

It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modification aforementioned.

What is claimed is:

1. An electrode support structure to load an electrode for electric heating of a workpiece, wherein;

the electrode support structure comprises one or more first members to hold the electrode and one or more second members fitting the one or more first members to receive a load from the one or more first members or to connect the one or more first members with a load means, and an elastic member made of insulator provided between the one or more first and second members in a manner that the one or more first and second members are connected through the elastic member, wherein the one or more first and second members are arranged in series along a direction of the load applied to the electrode, wherein the one or more first and second members have mutually complementary shapes fitting each other, and wherein the mutually complementary shapes of the one or more first and second members have nonparallel planes arranged to sandwich the elastic member for fitting the one or more first and second members to each other through the elastic member.

2. The electrode support structure according to claim 1, wherein the nonparallel planes have a step-difference structure.

3. The electrode support structure according to claim 1, wherein the elastic member is made of rubber and/or insulation resin.

4. The electrode support structure according to claim 1, wherein the one or more first members include an upper side first member provided at an upper side of the workpiece and a downside first member provided at a lower side of the workpiece, wherein an upper electrode provided at the upper side of the workpiece as the electrode and a lower electrode provided at the lower side of the workpiece as the electrode can be held on the upper side first member and the downside first member, respectively, wherein each of the electrodes has a planar, band-shaped or linear contact surface with the workpiece and sandwiches the workpiece by contacting thereon, and wherein the contact surface of at least one of the electrodes is band-shaped or linear.

5. The electrode support structure according to claim 4, wherein the band-shaped or linear contact surface is a part of a circular or oval section of a bar-shaped electrode.

6. An electric heating device having the electrode support structure according to claim 1 and one or more electrodes supported by the electrode support structure.

7. An electrode support structure to load an electrode for electric heating of a workpiece, wherein:

the electrode support structure comprises one or more first members to hold the electrode and one or more second members fitting the one or more first members to receive a load from the one or more first members or to connect the one or more first members with a load means, and an elastic member made of insulator provided between the one or more first and second members in a manner that the one or more first and second members are connected through the elastic member, wherein the one or more first and second members are arranged in series along a direction of the load applied to the electrode, wherein the one or more first and second members have mutually complementary shapes fitting each other, wherein the mutually complementary shapes of the one or more first and second members have nonparallel planes arranged to sandwich the elastic member for fitting the one or more first and second members to each other through the elastic member; and wherein the one or more first members include an upper side first member provided at an upper side of the workpiece and a downside first member provided at a lower side of the workpiece, wherein an upper electrode provided at the upper side of the workpiece, as the electrode and a lower electrode provided at the lower side of the workpiece, as the electrode can be held on the upper side first member and the downside first member, respectively, wherein each of the electrodes has a planar, band-shaped or linear contact surface with the workpiece and sandwiches the workpiece by contacting thereon, and wherein the contact surface of at least one of the electrodes is band-shaped or linear.

8. The electrode support structure according to claim 7, wherein the band-shaped or linear contact surface is a part of a circular or oval section of a bar-shaped electrode.

9. An electric heating device having the electrode support structure according to claim 8 and one or more electrodes supported by the electrode support structure.

10. An electric heating device having the electrode support structure according to claim 7 and one or more electrodes supported by the electrode support structure.

* * * * *